United States Patent
Dillon

(10) Patent No.: US 12,257,861 B2
(45) Date of Patent: Mar. 25, 2025

(54) NOTCHED TIRES TO SHIELD PLANTED CROP ROWS

(71) Applicant: Tribine Industries LLC, Logansport, IN (US)

(72) Inventor: Ben N. Dillon, Logansport, IN (US)

(73) Assignee: Tribine Industries, LLC, Logansport, IN (US)

(*) Notice: Subject to any disclaimer, the term of this patent is extended or adjusted under 35 U.S.C. 154(b) by 0 days.

(21) Appl. No.: 17/811,630

(22) Filed: Jul. 11, 2022

(65) Prior Publication Data

US 2023/0111788 A1 Apr. 13, 2023

Related U.S. Application Data

(60) Provisional application No. 63/262,098, filed on Oct. 5, 2021.

(51) Int. Cl.
*B60C 11/03* (2006.01)
*A01B 29/04* (2006.01)

(52) U.S. Cl.
CPC ........ *B60C 11/0311* (2013.01); *A01B 29/043* (2013.01); *B60C 2200/08* (2013.01)

(58) Field of Classification Search
CPC .............. B60C 2200/08; B60C 11/0311; B60C 17/009; B60C 2011/0341; A01B 29/043; A01C 5/066; A01C 5/068
See application file for complete search history.

(56) References Cited

U.S. PATENT DOCUMENTS

| | | | | |
|---|---|---|---|---|
| 3,538,971 | A * | 11/1970 | Stewart | A01C 5/068 |
| | | | | 152/452 |
| 4,124,079 | A * | 11/1978 | Crow | B62D 49/065 |
| | | | | 172/114 |
| 4,596,200 | A * | 6/1986 | Gafford | A01C 5/064 |
| | | | | 111/140 |
| 5,031,550 | A * | 7/1991 | Neal | A01C 11/02 |
| | | | | 111/104 |
| 2013/0192730 | A1* | 8/2013 | Morozumi | B29D 30/0661 |
| | | | | 152/209.1 |
| 2014/0305561 | A1* | 10/2014 | Phely | B60C 3/02 |
| | | | | 152/453 |

FOREIGN PATENT DOCUMENTS

WO   WO-2022184605 A1 *   9/2022  .......... A01B 29/043

OTHER PUBLICATIONS

WO-2022184605-A1 Machine Translation (Year: 2022).*

* cited by examiner

*Primary Examiner* — Justin R Fischer
*Assistant Examiner* — Wendy L Boss
(74) *Attorney, Agent, or Firm* — Emerson, Thomson & Bennet, LLC; Roger D. Emerson; Peter R. Deotrre

(57) ABSTRACT

Machines that plant crop seed generally compact the seed rows with their tires. The solution to this problem is to cut or mold notches into the tire lugs in the area that would pass directly above the planted seeds and adjacent to the planted seeds. Tires could also be molded with the notches in place during the tire manufacturing process. If lateral beaming strength is needed in the tire, ribs can be formed on the inside of the tire either intermittent or continuous across the width of the tire. Notching also could be done selectively on tires after molding.

7 Claims, 4 Drawing Sheets

NOTCHED TIRES TO SHIELD PLANTED CROP ROWS

CROSS-REFERENCE TO RELATED APPLICATIONS

This application claims benefit of U.S. Provisional No. 63/262,098 filed on Oct. 5, 2021.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to crop harvesting headers and more particularly to a header assembly that harvests both small grain and large grain.

Field crops, such as, for example, wheat, corn, and soybeans, generally are harvested by a machine that includes a crop gathering and feeding mechanism, a threshing and cleaning section, an operator's cab, and a tank to carry the clean grain to the end of the field. Historically, the gathering and feeding of corn ears has been done by a row crop specific mechanism generally referred to as a corn head that does not cut off the corn stalk, but rather strips the corn ear off the stalk and conveys it into the feeding and threshing section of the machine. Small grain crops, such as, for example, wheat or soybeans, typically have been cut at a specific height below the grain pods or plant head and the plant including some of the stalk fed into the threshing section of the machine. The plants typically are cut by a reciprocating sectional knife called a sickle. This prevailing harvesting method results in two separate and distinctly different crop gathering and feeding mechanisms, commonly called "heads" or "headers", or "cutter bars". A typical width for currently utilized crop gathering heads is 40'.

The crop gathering reels of the heads historically and typically have been used to pick up and push small grain plants such as wheat into a cutter mechanism such as a sickle. The reel also pushes the cut plant onto a conveying mechanism such as a belt or auger which moves it to the feeding section of the grain head where it is fed to the threshing section of the harvester. Reel mechanisms have only been recently used in corn harvesting to assist feeding of cornstalks that have been blown down by wind. Virtually all corn harvesting for grain is done by using horizontally deployed counter rotating rollers to jerk the corn stalk downward between two spaced apart adjustable plates which strip the grain bearing ear of corn off the stalk. Most of the stalk is intentionally left on the ground.

It is advantageous to have a vehicle with tires including traction lugs to pass in a guided manner over soil in which seeds have previously been planted. The lugs tend to pack the soil above the seeds and push the seeds deeper into the soil than originally placed. This inhibits or precludes the planted seed from emerging above the soil as a growing plant.

It is to the solution of this problem that the present invention is addressed.

BRIEF SUMMARY OF THE INVENTION

Machines that plant crop seed generally compact the seed rows with their tires. The solution to this problem is to cut or mold notches into the tire lugs in the area that would pass directly above the planted seeds and adjacent to the planted seeds. Tires could also be molded with the notches in place during the tire manufacturing process. If lateral beaming strength is needed in the tire, ribs can be formed on the inside of the tire either intermittent or continuous across the width of the tire. Notching also could be done selectively on tires after molding.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

Figure 1:
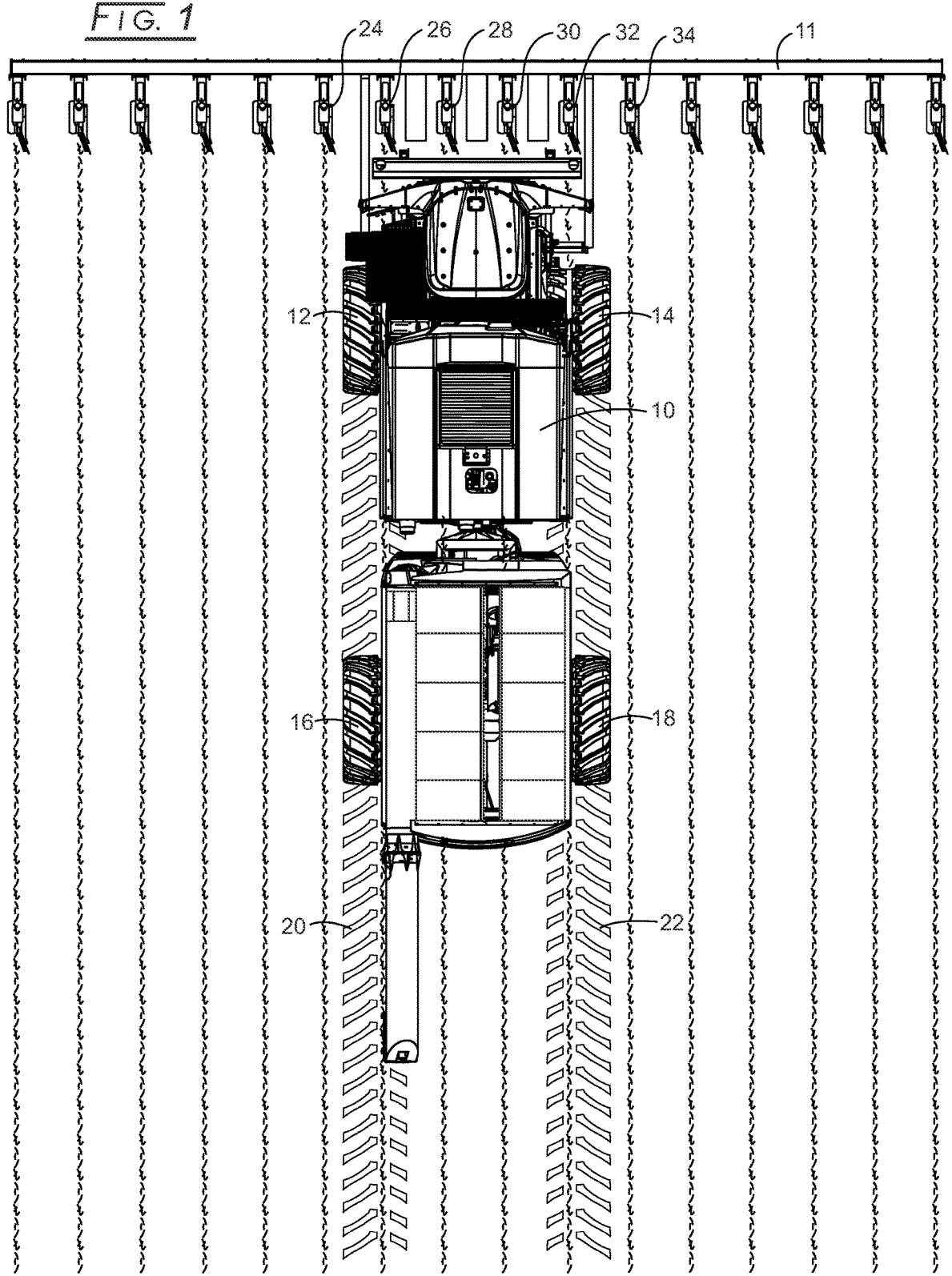
FIG. 1 is an overhead view of a crop field showing a harvester (sower) transversing the field to plant a crop row.

Referring initially to FIG. 1, a sower, 10, is shown, which in the drawings is a combine or harvester fitted with a forward seed bar, 11. Any brand sower is appropriate for the disclosed invention so long as it is wheeled with tires. The tired wheel assemblies, 12, 14, 16, and 18, leave tire tracks, 20 and 22, in the field as sower 10 traverses over the field to plant crop seeds. The weight of sower 10 causes tire tracks 20 and 22 to leave impressions often several inches deep into the seeded field, which pushes any crop seeds over which the wheel assemblies pass to be pushed further into the soil than is recommended for the crop seed to properly germinate and grow the desired crop.

Seed bar 11 has a plurality of planting mechanisms, as typified by planting mechanisms 24-32. The number of such planting mechanisms can be greater or lesser than is illustrated in FIG. 1 and it is unimportant for present purposes how the planting mechanism operates. Suffice it to say that any planting mechanism carried by a seed bar is useful for purposes of the present invention. Of importance for present purposes is that seed planting mechanisms 26 and 32 are in direct line with all of the tired wheel assemblies as is seen in more detail in FIGS. 2 and 3.

Figure 2:
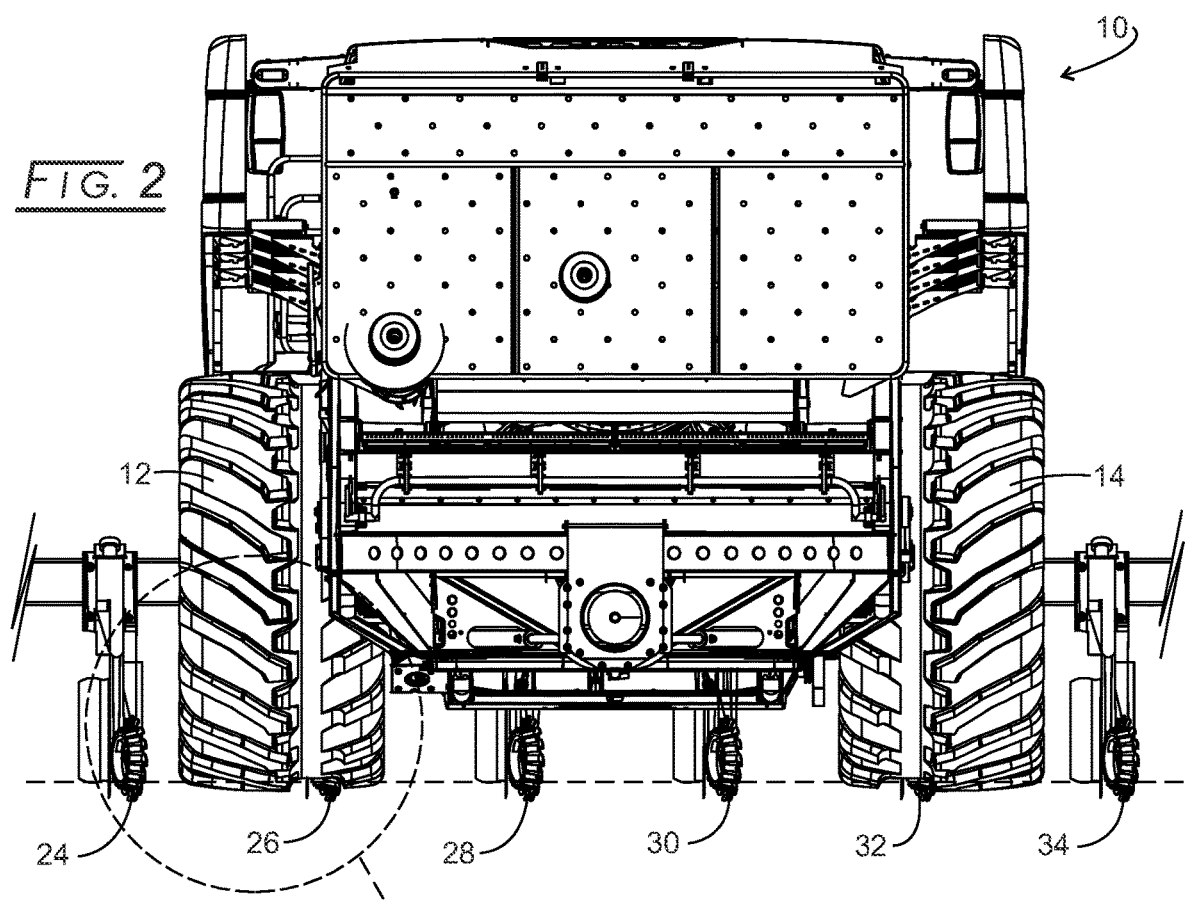
FIG. 2 is a sectional view taken along line 2-2 in FIG. 1.
Figure 3:
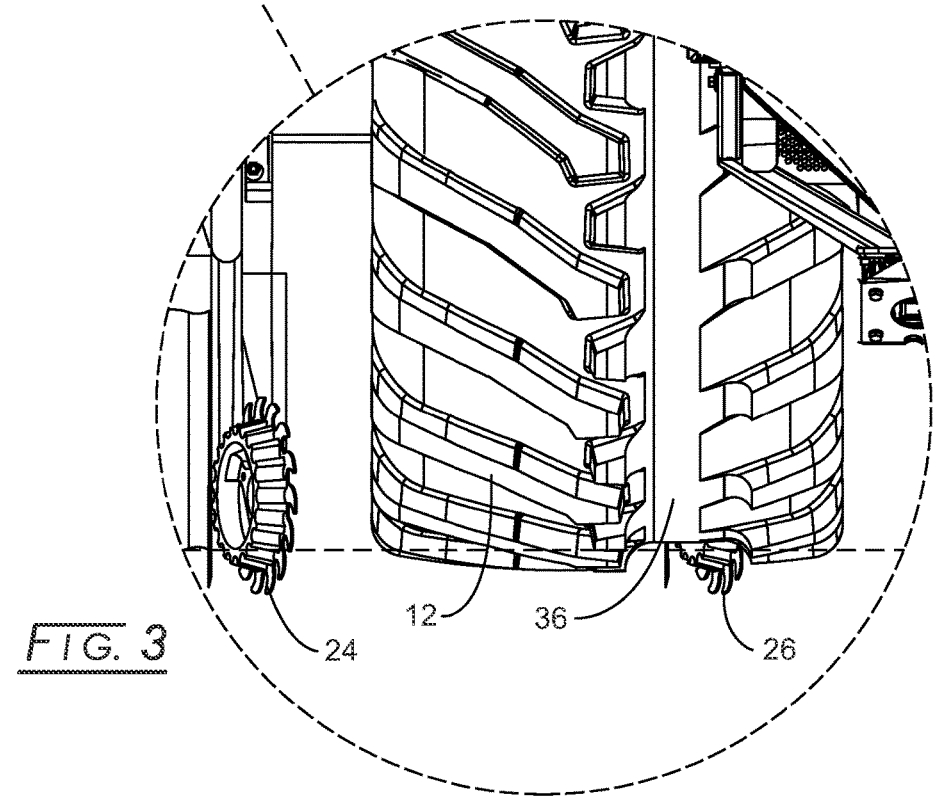
FIG. 3 is an exploded view of a front wheel assembly having a notched show according to the present disclosure.

Referring now also to FIGS. 2 and 3, planting mechanisms 24-32 are shown along with tired wheel assemblies 12 and 14. It will be observed that each of the planting mechanisms carried by seed bar include an angled rotating cutting wheel, such as is illustrated by angled rotating cutting wheel 34. The crop seeds fall from seed bar 11 into the depressions formed by the cutting wheels. Thereafter, however, the wheel assemblies push the crop seeds planted in aligned with the wheel assemblies to far into the field for such crop seeds to grow.

It also will be observed that each of the wheels have a notch, groove, or depression, as illustrated by notch 36 in tired wheel assembly 12, in alignment with 2 sets of the angled rotating cutting wheels, which prevents the tired wheel assemblies from pushing the crop seeds too far into the ground. FIG. 3 illustrates such notches in the tires that pass over the planted crop seeds. Notch 36 extends circumferentially around the tires, as illustrated in the drawings.

Figure 4:
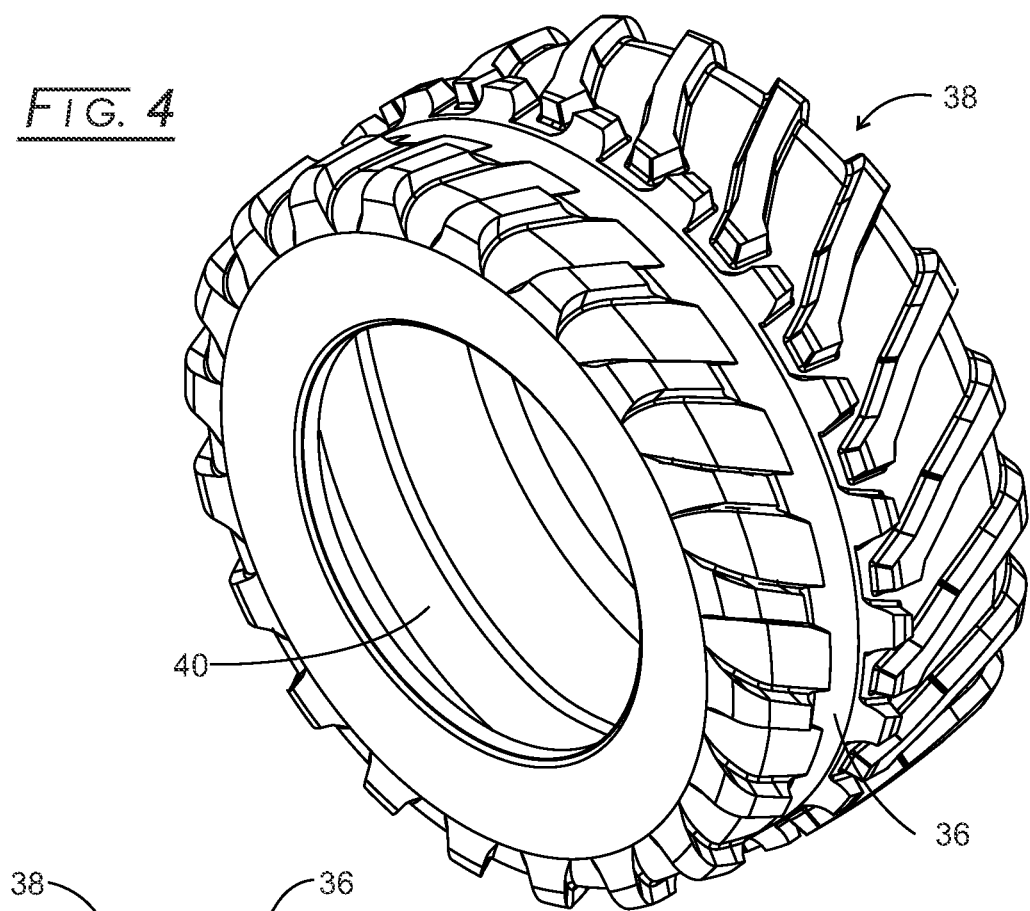
FIG. 4 is an isometric view of one of the disclosed notched tire.
Figure 5:
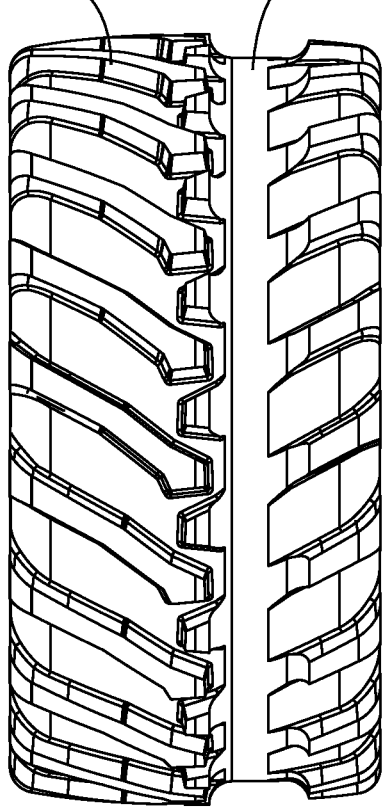
FIG. 5 is a rear view of the notched tire of FIG. 4.

Referring now also to FIGS. 4 and 5, a tire, 38, of tired wheel assembly 12 is shown therein. While notch 36 is shown as a generally U-shaped, virtually any shape of notch is suitable so long as its depth is sufficient to accommodate the depth that the seeds are planted. While notch 36 may push the crop seeds a bit further in the soil, the crop seeds are not sufficiently deep to preclude germinating and growing. The notches can be formed into the tires during molding as shown in the drawings, such notches could be postformed into the tires. The method of creating such notches is unimportant to their function as described herein. If additional lateral beaming strength is needed in the tire, stiffening ribs, 40, can be formed on the inside of the tire either intermittently or continuously to provide support for the tire where the notches are located.

Figure 6:
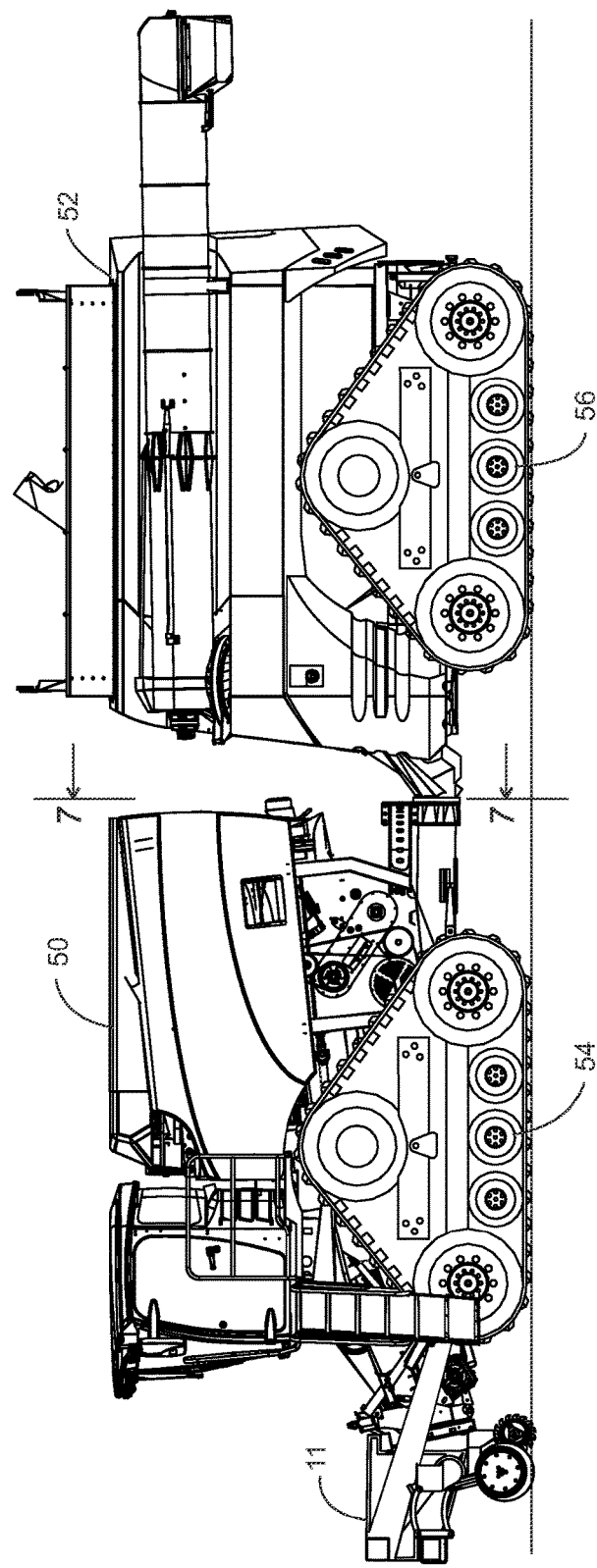
FIG. 6 is a side view of a tracked articulated harvester with a tracked rear unit.
Figure 7:
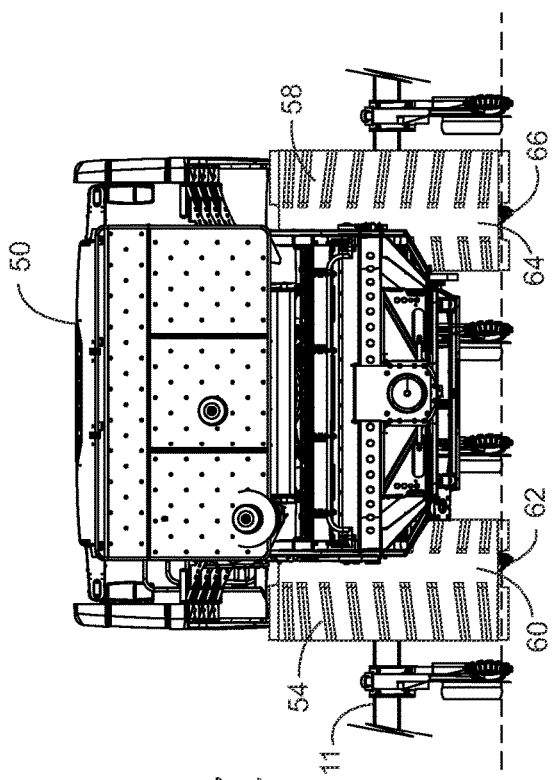
FIG. 7 is view taken along line 7-7 of FIG. 6.

The notched tire concept also can be applied to seed planting machines that are tracked, such as is illustrated in FIGS. 6 and 7. In particular, a forward powered unit, 50, and a towed/powered rear unit, 52, are seen to be fitted with seedbar 11, as described hereinbefore for planting seed crops, carrying seed planting mechanisms. In this case, however, both units 50 and 52 are tracked, rather than wheeled, as shown by a tracks, 54 and 58, for forward unit 50 and s tracks, 56, for rear unit 52. It will be appreciated that rear unit 52 has a track on the opposite side from tack 56 that is not shown in the drawings.

Referring with particular reference to FIG. 7, it will be seen that track 56 has a notch, 60, formed in it in alignment with a planting mechanism, 62. Similarly, track 58 has a notch, 64, formed in it in alignment with a planting mechanism, 66. Although not shown in the drawings, both tracks of rear unit 52 have notches formed in them which notches are in alignment with notches 60 and 64. That is notch 60 is in alignment with the notch in track 56, while notch 64 is in alignment with the notch is the not shown track of rear unit 52. Since the rear unit tracks (and rear unit tires) pass over the just planted crop seeds, they also require notching. It will be understood that the notched tires/treads of the invention function not only while the crop seed is being planted, but also during future excursions across the crop seed planted fields, such as, for example application of herbicide or fertilizer.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. An improved machine that plants crop seed in rows in a crop growing field, the machine having wheels carrying tires having lugs extending outwardly from the tire, the improvement which comprises:
   (a) a seed bar having at least one cutting wheel carried by the machine at its front for dispensing crop seed into depressions in the crop growing field;
   (b) at least one of the tires of the tired wheeled machine having at least one notch extending circumferentially therearound and extending into the tire and tire lugs for the notches to pass over the crop seed in the depressions in the crop growing field, the seed bar located ahead of the tires of the tired wheeled machine wherein the at least one notch is in alignment with the at least one cutting wheel such that the crop seeds are not pushed by the notched-tires sufficiently deep into the depressions to preclude germinating and growing.

2. The improved tired wheeled machine of claim 1, wherein the at least one notch is generally U-shaped.

3. The improved tired wheeled machine of claim 1, having at least 2 wheels carrying tires having tire treads, wherein both of the tires of the tired wheeled machine have at least one notch extending circumferentially therearound and extending into the tire tread for the notches to pass over the crop seed in a crop growing field.

4. The improved tired wheeled machine of claim 3, having at least 4 wheels carrying tires, wherein each of the at least 4 tires have at least one notch extending circumferentially therearound and extending into the tire tread for the notches to pass over the crop seed in a crop growing field.

5. The improved tired wheeled machine of claim 1, wherein the at least one tire of the tired wheeled machine has a stiffening rib inside the tire where the notch is located.

6. The improved tired wheeled machine of claim 3, wherein both of the tires of the tired wheeled machine have a stiffening rib inside the tire where the notch is located.

7. The improved tired wheeled machine of claim 4, wherein all the tires of the tired wheeled machine have a stiffening rib inside the tire where the notch is located.

* * * * *